US007822732B2

(12) United States Patent
Bodapati

(10) Patent No.: US 7,822,732 B2
(45) Date of Patent: Oct. 26, 2010

(54) METHOD AND SYSTEM TO ENABLE DOMAIN SPECIFIC SEARCH

(76) Inventor: Chandra Bodapati, 1340 S. De Anza Blvd. Ste. 106, San Jose, CA (US) 95129

( * ) Notice: Subject to any disclaimer, the term of this patent is extended or adjusted under 35 U.S.C. 154(b) by 274 days.

(21) Appl. No.: 11/838,199

(22) Filed: Aug. 13, 2007

(65) Prior Publication Data
US 2009/0049010 A1 Feb. 19, 2009

(51) Int. Cl.
*G06F 7/00* (2006.01)
*G06F 17/30* (2006.01)
(52) U.S. Cl. ........................ 707/706; 707/707
(58) Field of Classification Search ................ 707/781, 707/748, 769, 709, 804, 706, 610, 738
See application file for complete search history.

(56) References Cited

U.S. PATENT DOCUMENTS

| | | | |
|---|---|---|---|
| 2002/0120532 A1* | 8/2002 | McGovern et al. | 705/26 |
| 2002/0169776 A1* | 11/2002 | Tuunanen et al. | 707/9 |
| 2005/0021553 A1* | 1/2005 | Romijn et al. | 707/102 |
| 2005/0177562 A1* | 8/2005 | Raciborski | 707/3 |
| 2006/0253427 A1* | 11/2006 | Wu et al. | 707/3 |
| 2007/0288440 A1* | 12/2007 | Harlow et al. | 707/3 |
| 2008/0033917 A1* | 2/2008 | Jones et al. | 707/3 |
| 2008/0263620 A1* | 10/2008 | Berkvens et al. | 725/136 |

OTHER PUBLICATIONS

Suresh K. Bhavani, Domain Specific Search Strategies for the Effective Retrieval and Shopping Information, Apr. 20-25, 2002, ACM, CHI 2002, pp. 610-611.*

* cited by examiner

*Primary Examiner*—Charles Rones
*Assistant Examiner*—Fariborz Khoshnoodi

(57) ABSTRACT

A method and a computer system to enable domain specific search is disclosed. The present invention enables creation and sharing of domain specific search scripts, where search intelligence relating to domain and search engines is encapsulated in a parameterized domain specific search script. The system provides a customizable knowledge base to be used to configure the parameters specific to a chosen domain. Users can parameterized search scripts and configure search scripts according to their search needs. Users can use search scripts to perform complex domain specific searches by specifying input search string and without having to worry about refining results. The system uses the parameterized search scripts and configuration information along with user input search string to build search engine independent and search engine dependent queries from one or more search engines to provide relevant results to user.

25 Claims, 17 Drawing Sheets

Upload Script

Script Name: [          ]

Description: [          ]

1002

Price: [     ] USD

☐ Make available for free

1004

Uploaded script:    Search script 3

[ Submit ]    [ Cancel ]

| Portal Settings | | | |
|---|---|---|---|
| Caption | Site Name | Keyword | Site Query |
| angelfire.com | angelfire.com |  | http://www.angelfire.lycos.com |
| craigslist.org | craigslist.org | Inurl:"/res/" | http://sfbay.craigslist.org |
| linkedin.com | linkedin.com | Inurl:("/res/" | "/pub/") | http://www.linkedin.com |
| portfolios.com | portfolios.com | -submit | http://www.portfolios.com |
| emurse.com | emurse.com | -submit -intitle:"emurse" | http://www.emurse.com |
|  | Insert Row | Delete Row | OK | Cancel |

Fig 12

Location Settings

| Location Name | Zip Range | Timezone | Phone |
|---|---|---|---|
| NY OR New York | 10000 to 14999 OR 06390 OR 00501 OR 00544 | EST | 212 OR 315 OR 347 OR 516 OR 518 OR 585 OR 607 OR 631 OR 646 OR 716 OR 718 OR 845 OR 914 OR 917 |
| CA OR California | 90000..96199 | PST | 209 OR 213 OR 310 OR 323 OR 408 OR 415 OR 424 OR 510 OR 530 OR 559 OR 562 OR 619 OR 626 OR 650 OR 661 OR 707 OR 714 OR 760 OR 805 OR 818 OR 831 OR 858 OR 909 OR 916 OR 925 OR 949 OR 951 |
| AL OR Alabama | 35000..36999 | CST | 205 OR 251 OR 256 OR 334 |
| AK OR Alaska | 99500..99999 | CST | 907 |
| AZ OR Arizona | 85000..86999 | MST | 480 OR 520 OR 602 OR 623 OR 928 |

[ Insert Row ] [ Delete Row ] [ OK ] [ Cancel ]

Fig 14

Available Scripts / 1602

| Script Name | Description | Price | |
|---|---|---|---|
| John's java resume specification | Search specification for searching j2ee resumes | USD 20 | Buy |
| Ryan's .Net resume specification with profile | Search specification for searching .Net resumes | USD 50 | Buy |
| David's sample java resume specification | Search specification for searching java resumes | Free | Download |

Fig 16

METHOD AND SYSTEM TO ENABLE DOMAIN SPECIFIC SEARCH

FIELD OF THE INVENTION

The present invention relates to the field of searching information. More particularly, the invention relates to a method and system to create and share domain specific search scripts to enable domain specific search.

BACKGROUND AND PRIOR ART

The rapid growth of the World Wide Web and information available through the web led to a problem of information retrieval. As a result, many search engines have come up to retrieve information according to the needs of the users on the web, Google and Yahoo being examples such search engines. Most of the search engines provide a facility to search information based on keywords.

Most often users are concerned about their area of expertise or their domain of work when they search for information. Users of search engines would like to search for information relating to their work. While they tend to use keywords that are common in their domain, it is possible that the same keywords are used with a different meaning in a different context or domain. For example, a hiring consultant might want to search for all resumes (curriculum vitae) relevant to a profile and would want to include the keyword "resume" in his search query. But "resume" could also mean "to start something". Also there could be many pages on the web that would be seeking "resumes" from potential candidates. Even though in such pages the keywords are used in the context of the same domain, user who is searching for resumes would not be interested in browsing through such pages.

Most search engines provide advanced options to make the search query more refined and specific to the needs of the user. To tap the full potential of the search engines the user should be aware of the complete search language and the various options provided by the search engines. A typical user does not have the time and patience to read and understand the various options available and most often tends to use the basic keyword search. Besides, the options provided are in different format across different search engines and sometimes options are not common across search engines.

Most search engines search indexed documents from the web. Due to large volume of documents on the web, it is impossible for any one search engine to index all available documents on the web. Hence, different search engines may have a different set of indexed documents. While all search engines might have documents that are relevant for a user, it is possible that different search engines show different results for the same query. Besides, search engines have their own search and ranking strategy. This would make it difficult for a user to choose the right search engine for their needs.

Various metasearch engines have emerged which act as a bridge between the users and other search engines. They save the effort of accessing multiple search engines and trying to figure out results in each one separately. If the user were to search individually in each of search engines, the user would be encountering a lot of repetitive results as well. The metasearch engines help solve such problems. However, still the user has to go through a number of documents to figure out which ones are important and which are not.

U.S. Pat. No. 6,363,376 discloses a method of querying multiple career websites to post job seeker information to multiple career websites from a single interface. However, the invention disclosed does not address the problem of searching generic search engines to retrieve domain specific information. Furthermore, the query used to search career websites is being provided by the user. There is no intelligence or a filter mechanism to ensure that the job postings being applied for are indeed matching the candidate in all respects.

Therefore it would be advantageous to have a tool that can act as a metasearch engine and at the same time capture intelligence relating to specific domains to be able to perform domain specific searches without the user actually knowing the advanced search techniques available in various search engines.

Attempts have been made to provide domain specific results based on user queries through a number of ways.

U.S. Pat. No. 6,920,448 discloses a method of performing domain-specific metasearch and obtaining search results, where a metasearch engine is provided to fetch results from various search engines and displayed to the user. The obtained search results are further processed by a data mining module to form clusters of related documents and display to user. The patent further discloses categorization mechanisms where clustered documents are categorized according to pre-defined set of categories. Furthermore, the patent discloses a mechanism to manually specify or automatically generate stop word lists that can be stripped off from search documents before processing by the data mining tool. The method disclosed employs a search result refining process rather than a query optimization process. As a result, it is possible that a number of irrelevant results might be retrieved and unnecessary processing might be performed at the client side.

U.S. Pat. No. 6,513,031 discloses a method refining a query to find results in a specific search area, where the search area is identified using a combination of query analysis including number of query terms and natural language parsing, and using user profile information. Furthermore, the search area is also identified by comparing search query to text found in pages on a network. The invention disclosed involves a lot of interaction with the user and requires user input in multiple stages to identify a search area based on previously visited websites, possible topics, user profile and scope clues. The invention in U.S. Pat. No. 6,513,031 is more intended to an average user to help him identify his area of interest. For a professional user who wants to retrieve domain specific results from various sources, he would not want to spend time in providing inputs every time to decide on an interest area.

U.S. Pat. No. 6,411,950 discloses a method and apparatus for dynamic search result refinement by refining a vague text-search query into a more specific text-search query. The method includes generating a phrase list to refine a query to more specific query. Phrase list is constructed using queries from multiple users. Also, the phrase list may be constructed by picking a list that is only statistically significant; the significance being determined by the number of times a particular phrase appears in the received user queries. The method as disclosed in the invention requires infrastructure to collect and analyze queries from various users and index them to arrive at a refinement strategy to be presented to the user for selection. User still has to select from a list of possible options for the query terms provided to refine the results.

The present invention provides a method and a computer program product to assist users in performing domain specific searches across multiple search engines, without the user actually knowing any advanced search techniques of any of the search engines being searched in. The present invention provides a mechanism where domain intelligence is hidden from the user and the user does not have to provide inputs to refine query every time he inputs a query. The embedded intelligence ensures that the query returns relevant results and no other processing is required to be performed by the user. Furthermore, the search intelligence can be shared by users with other users.

SUMMARY OF THE INVENTION

An object of the invention is to provide a method and a system to enable domain specific search.

Another object of the invention is to provide a method and a system to create and share domain specific search scripts.

Yet another object of the invention is to abstract the search complexity of individual search engines, by offering a unified way of representing the domain intelligence in domain specific search scripts.

Accordingly, in one aspect, the present invention provides a system to enable a user to perform domain specific search in one or more search engines, the system comprising of a computer program product embodied in a computer readable medium on a computer and a remote server. The computer program product provides a means to create a domain specific search script by allowing users to specify domain specific search keywords along with placeholder for input search string, and placeholders for a plurality of domain specific parameters whose values are configurable. Upon defining the keywords and placeholders users can save a script. The computer program product creates a search script and saves the script in a pre-defined format with placeholders for input search string and plurality of domain specific parameters for subsequent use and sharing. The computer program product further comprises of a means to select a search script from one or more saved search scripts to perform a domain specific search. Furthermore, the computer program product comprises of means to specify input search string to search using a selected search script in one or more searching engines according to the script selected. The computer program product also provides means to share available search scripts. The search scripts can be shared by directly uploading search scripts to a remote server. Alternatively, the search scripts can be shared by directly emailing a search script to another user.

In another aspect, the present invention provides a method to enable a user to be able to perform domain specific searches in one or more search engines. Users specify domain specific search keywords along with placeholder for input search string, and placeholders for a plurality of domain specific parameters whose values are configurable. The computer program product of the invention creates a search script in a pre-defined format with placeholders for input search string and plurality of domain specific parameters. Upon creation of at least one search script, user configures the values of the plurality of domain specific parameters. Further, user can select a search script to perform a domain specific search by specifying at least one keyword to perform the search. The computer program product replaces the placeholders in the selected search script by the input search string as provided by the user and the configured values to perform search in one or more search engines according to the search script and displays results obtained from said one or more search engines by invoking one more instances of a preferred web browser of the user.

In another aspect, the present invention provides a method to enable a user to be able to share domain specific search expertise, by sharing domain specific search scripts. An expert user specifies domain specific search keywords along with placeholder for input search string, and placeholders for a plurality of domain specific parameters whose values are configurable. The computer program product of the invention creates a search script in a pre-defined format with placeholders for input search string and plurality of domain specific parameters. Upon creation of at least one search script, user can select a search script to share his expertise. The search scripts can be shared by directly uploading search scripts to a remote server. Alternatively, the search scripts can be shared by directly emailing a search script to another user.

In another embodiment, user can share a search script along with his profile, where profile includes the configuration tables for domain specific parameters.

In another aspect, the present invention provides a method to enable a user to be able to perform domain specific searches in one or more search engines, by receiving domain specific search script from an expert user. The system of the invention presents a list of available search scripts that can be obtained from expert users. User selects a search script to download and registers the search script on a computer program product. Upon selection of at least one search script obtained from an expert user, the user can perform a domain specific search by specifying an input search string with one or more keywords to perform the search. The computer program product replaces placeholders in the selected search script by the specified input search string as provided by the user and the configuration values to perform search in one or more search engines according to the search script and displays results obtained from said one or more search engines by invoking one more instances of a preferred web browser of the user.

In another aspect of the invetion, the present invention provides a system comprising of a remote server, a computer program product and a communications link established between said remote server and said computer program product to enable the aforementioned methods.

Further objects, features and advantages will become apparent from the following description, claims and drawings.

BRIEF DESCRIPTION OF THE DRAWINGS

The above aspects of the invention are described in detail with reference to the attached drawings, where:

FIGS. 8, 9, 11, 12, 13, 14, 15 show configuration options provided by the tool bar according to a preferred embodiment of the invention;

FIG. 10 shows a web page for uploading the information for sharing a search script; and FIG. 16 shows the web page hosted on the remote server listing available search scripts for download either for a license fee or for free.

DETAILED DESCRIPTION OF THE INVENTION

Figure 1:
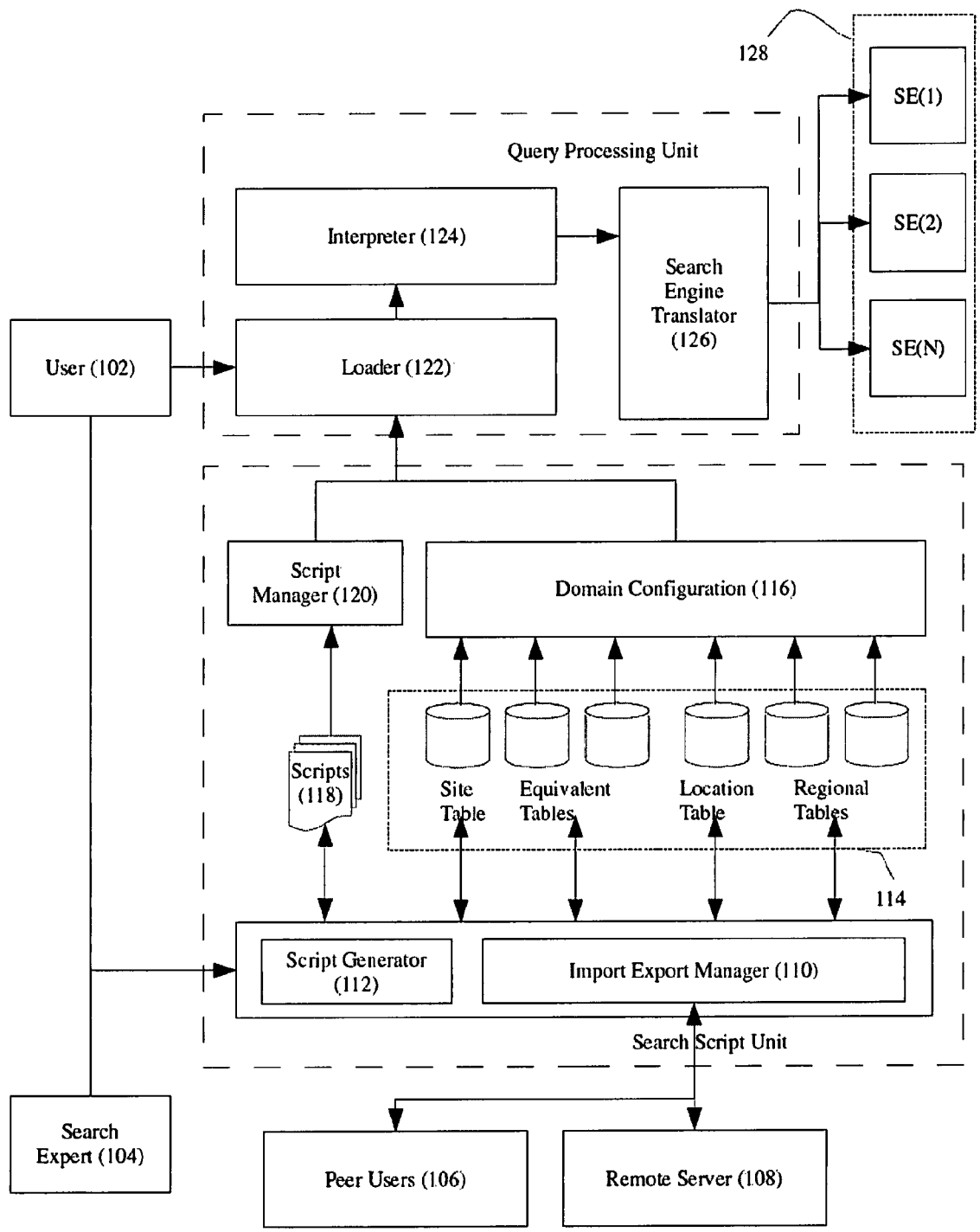
FIG. 1 is a block diagram of the system of the invention.

FIG. 1 is a block diagram of the system of the invention. The system comprises of a remote server (108); a search script unit comprising of a script (words "script" and "search script" are interchangeable) generator (112), an import export manager (110), a domain configuration module (116), a script manager (120), and a plurality of domain configuration tables with pre-loaded information (also called "knowledge base") (114); and a query processing unit comprising a loader (122) to load search scripts, an interpreter (124) to interpret search script and replace placeholders in loaded search scripts with values from a plurality of configuration tables as configured by a user to form a search engine independent query, and a search engine translator (126) to translate search engine independent query into one or more search engine specific queries to be used to query one or more search engines. Various users interact with the system to create and share search scripts along with performing domain specific searches. A user (102) is a user who uses the system to perform domain specific searches either by creating a new search script or by using a shared search script. A search expert (104) is also a user, who is an expert at creating search scripts to get relevant results specific to a domain. There are also a plurality of peer users (106) who interact with the system who are willing to buy/receive shared search scripts for conducting domain specific searches.

Figure 2:
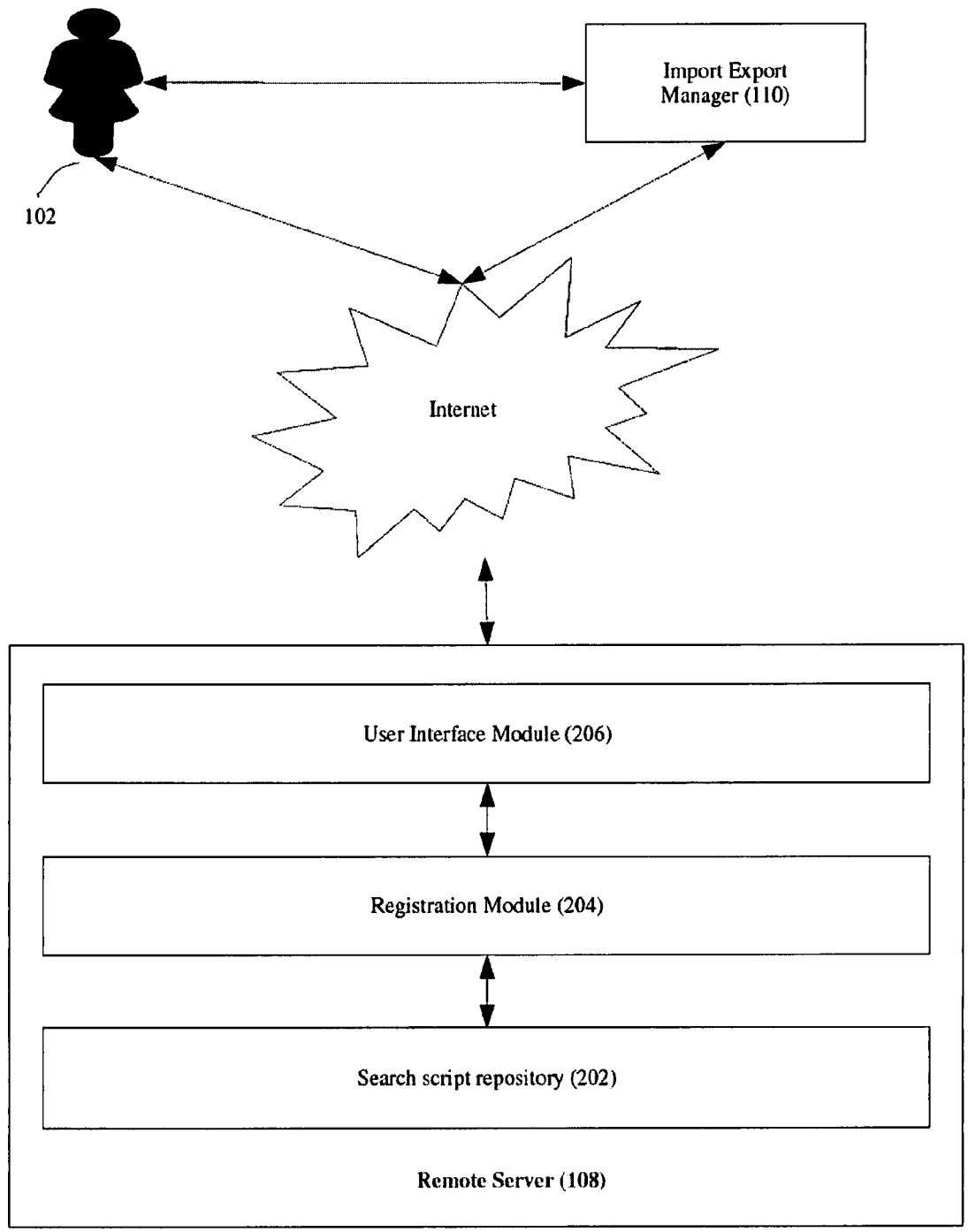
FIG. 2 is an environment diagram showing interaction between user and the system, and also shows the modules in the remove server of the system.

FIG. 2 is an environment and block diagram showing the interaction between the import export manager (110) of search script unit, the user (102), and the remote server (108). The system and the users are connected over a communication link (ex: Internet). FIG. 2 also shows the various modules that are part of the remote server (108). The remote server (108) comprises of a search script repository (202) of all search scripts uploaded onto the server for sharing either for a payment or for free. The remote server further comprises of a registration module (204) to register various search scripts uploaded and a user interface module (206) for users to interact with the remote server.

Traditionally, to do a domain based search, a user is required to know the search domain and the search language of the search engines. For example a recruiter searching for resume would go through the following steps:

User specifies the essential keywords
  Java developer
To refine the search results, user adds positive search keywords with or without advanced operators. For example, "inurl:" is an example of an advanced operator which suggests that the following keyword should be found in the URL of a page. Also in the following example (and elsewhere in the specification), "~" (tilda) is used to find a keyword along with its synonyms.
  Java developer ~resume inurl:resume
To refine the search results further, user adds negative search keywords. Negative search keywords are the keywords that the user does not to be part of a result page and such keywords are preceded by a "-" (minus sign or dash).
  Java developer ~resume inurl:resume -jobs Furthermore, the user might add filters for narrowing the search results specific to a location, such as for example when the user is looking for resumes of people from a specific location
  Java developer ~resume inurl:resume -jobs New York OR NY For every domain, there are certain parameters based on which searches are performed. The present invention automates the search process by splitting a search query into parts that are parameterized based on the parameters that are important for a particular domain. Placeholders are created for each of the parameters. There are two kinds of placeholders, namely—input search string placeholder, and domain specific parameter placeholder. A knowledge base is provided using which users can configure the parameters and refine domain specific searches without modifying the search query. Parameterized search queries are stored in search scripts and are subsequently converted into search engine independent and search dependent queries to fetch results. Users need not change the parameterized search queries (stored in search scripts) every time. Instead users can create as many search script with different parameterized search queries and perform searches according to their need and convenience. Also, each script can itself contain more than one parameterized search query.

A sample search query and corresponding parameterized search query (as stored in search scripts) are as follows:

Search query: Java developer ~resume inurl:resume -jobs NewYork OR NY Parameterized search query: @KEYWORD ~resume inurl:resume -jobs @LOCATION The word "KEYWORD" is a placeholder for input search string provided by user and the word "LOCATION" is a place holder for the parameter location, location being one of the parameters that is important for people who search for resumes. The symbol "@" is a delimiter to identify a placeholder. This makes the job of a user much easier. The user who wishes to perform a domain specific search to find resumes using the aforementioned parameterized search query, needs to input the keywords "Java developer" and configure the other parameters according to his choice using the domain specific knowledge base built based a set of domain specific parameters.

The present invention provides for a plurality of placeholders for domain configuration parameters which can be dynamically interpreted and filled with values provided in configuration information for the parameters. Table 1 shows the various placeholders for parameters that are allowed and the meaning for the placeholders. The table is does not show an exhaustive list of parameters that are actually useful for finding resumes and any skilled person in the art would be able to appreciate that these and many such parameters could be added and knowledge base could be built to enable domain specific searches in the field of finding resumes.

TABLE 1

| Placeholder | Description |
| --- | --- |
| KEYWORD | The input search string to be searched for in the specified search engines.<br>Ex: KEYWORD = Java, C++ (skills) |
| DEFAULT_KEYWORD | Default set of keywords to be attached to the input search string provided by the user of the search script<br>Ex: experience 5 years |
| SITE/PORTAL | Specifies the website or portals from which the search results are to be obtained.<br>Ex: SITE = craigslist.org |

TABLE 1-continued

| Placeholder | Description |
|---|---|
| SITE_KEYWORD | Keyword to be attached for a specific site or portal.<br>Ex: SITE_KEYWORD = "reply to" where SITE = craigslist.com |
| LOCATION | Specifies the place from which the search results are obtained.<br>Ex: LOCATION = NY OR "New York" |
| TZ | Specifies the locations to be covered based on the time zone.<br>Ex: TZ = EST. All locations with EST time zone will be included. |
| ZIP | Specifies the range of zip codes from which the search results are obtained.<br>Ex: ZIP = 10000 . . . 14999 OR 06390 OR 00501 OR 00544 |
| RADIUS_ZIP | Specifies the radius distance around a zip code to retrieve results within that location.<br>Ex: RADIUS_ZIP(95070,50) means to fetch results limited to the location range including 50 miles radius from the zip location 95070. |
| PHONE | The PHONE specifies the area code of the state from which the search results are obtained.<br>Ex: 480 OR 520 OR 602 OR 623 OR 928 |
| SEARCH_ENGINE<br>OR<br>SEARCH_URL | Search scripts can be used to execute the search query across different search engines.<br>Ex:<br>SEARCH_ENGINE = GOOGLE<br>OR<br>SEARCH_URL = www.google.com |
| EQ | Specifies that extension keywords (or equivalents) for the enclosed keyword should be included<br>Ex: @EQ(Java) = Java OR J2EE OR JSP OR J2ME OR EJB |

Figure 3:
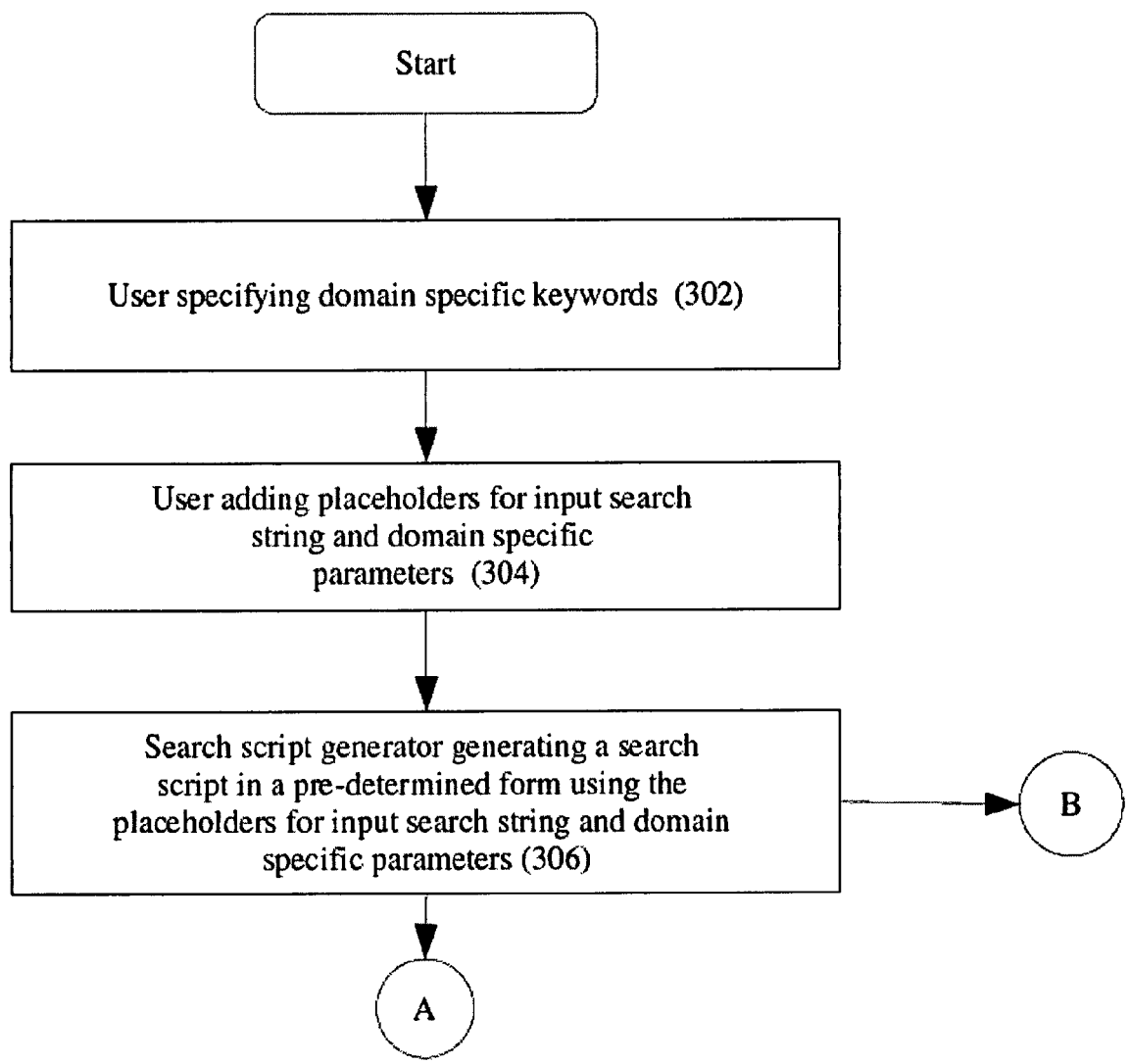
FIG. 3 is a flow chart showing the steps in creation of a search script.

FIG. 3 shows the flow diagram showing a method of creating a search script. Users specifies domain specific search keywords (ex: ~resume) (302) and user adds placeholder for input search string and placeholders for a plurality of domain specific parameters (ex: LOCATION) (304) whose values are configurable using the knowledge base. The search script generator of the system of the invention creates a search script and saves the script in a pre-defined format with placeholders for input search string and plurality of domain specific parameters (306) for subsequent use and sharing.

Figure 4:
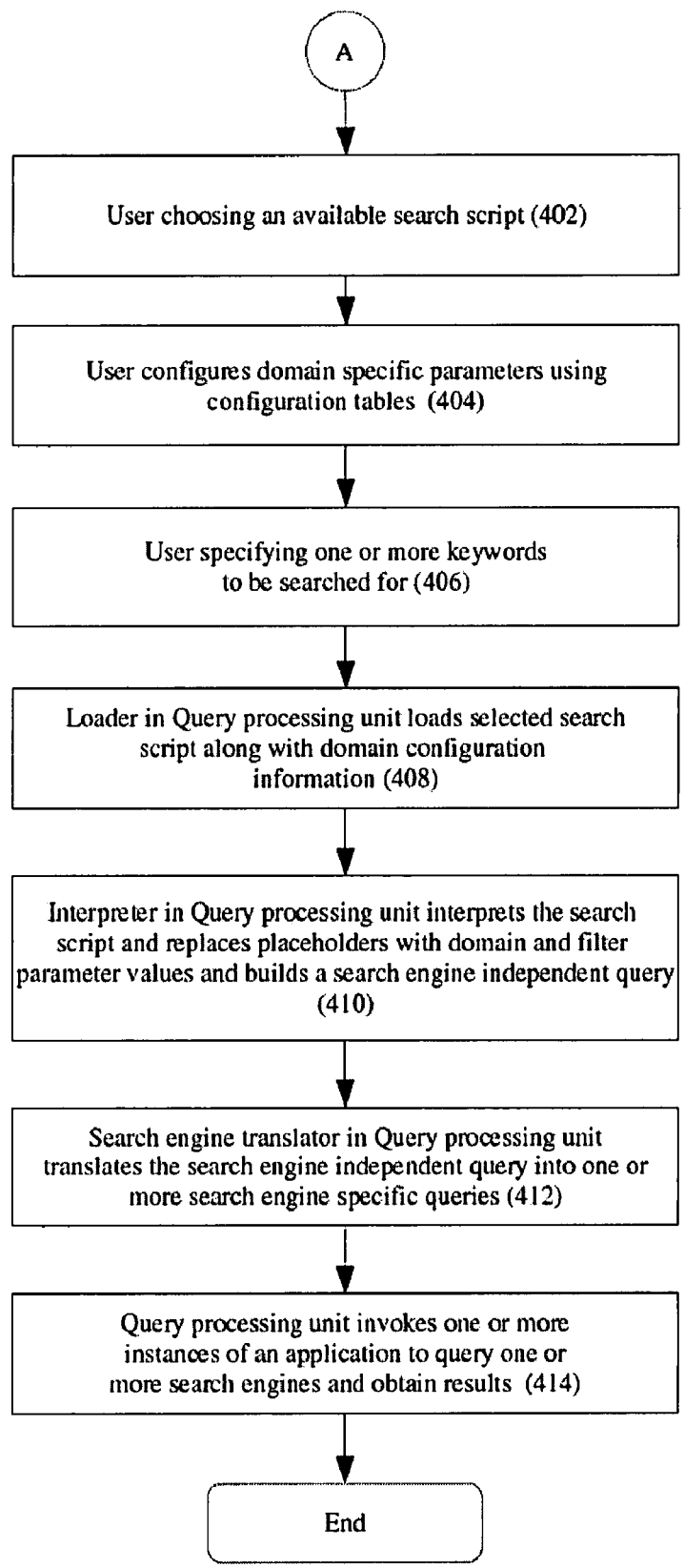
FIG. 4 is a flow chart sowing the steps in using a search script for a domain specific search.
Figure 5:
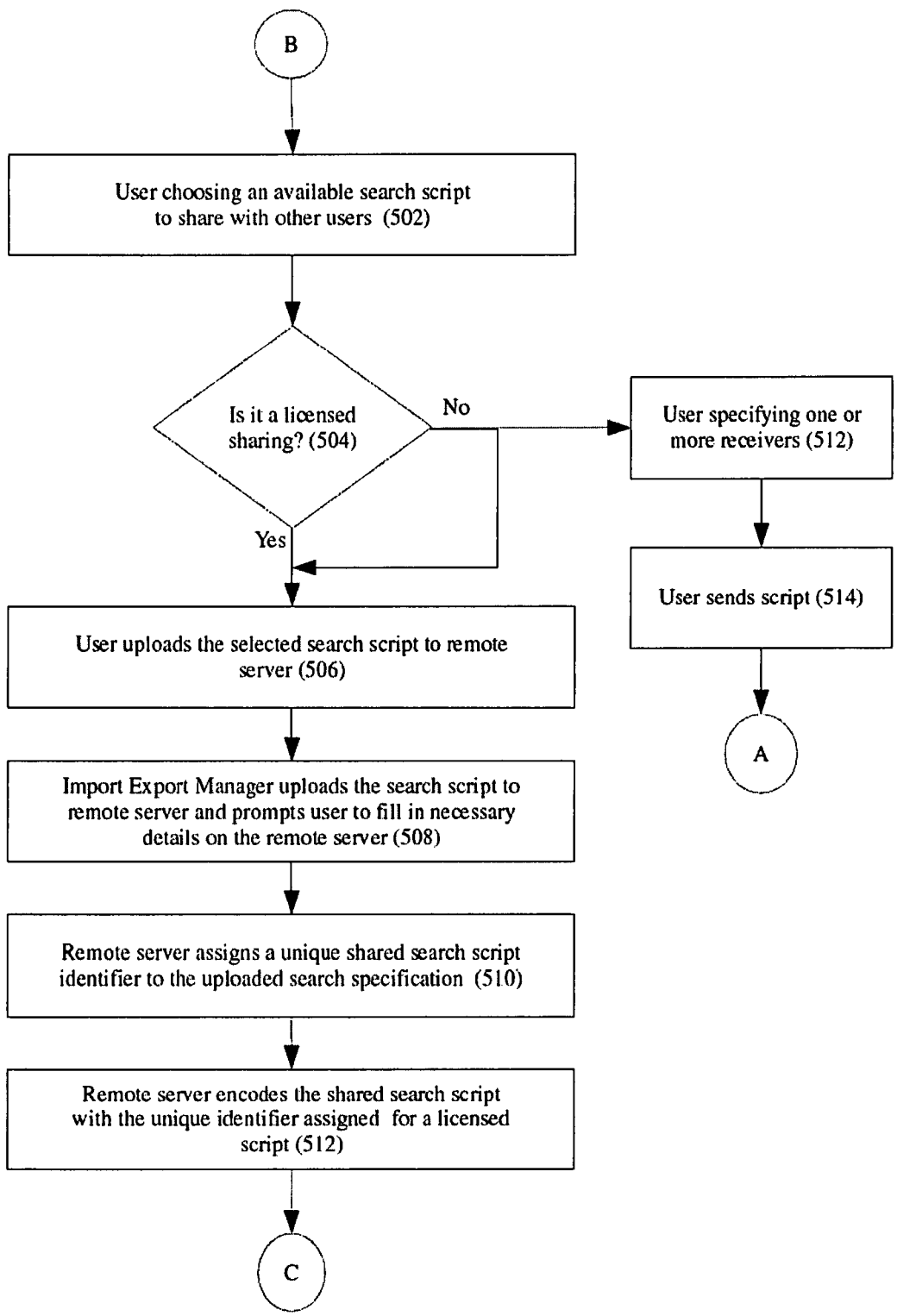
FIG. 5 is a flow chart showing the steps in sharing a search script.
Figure 6:
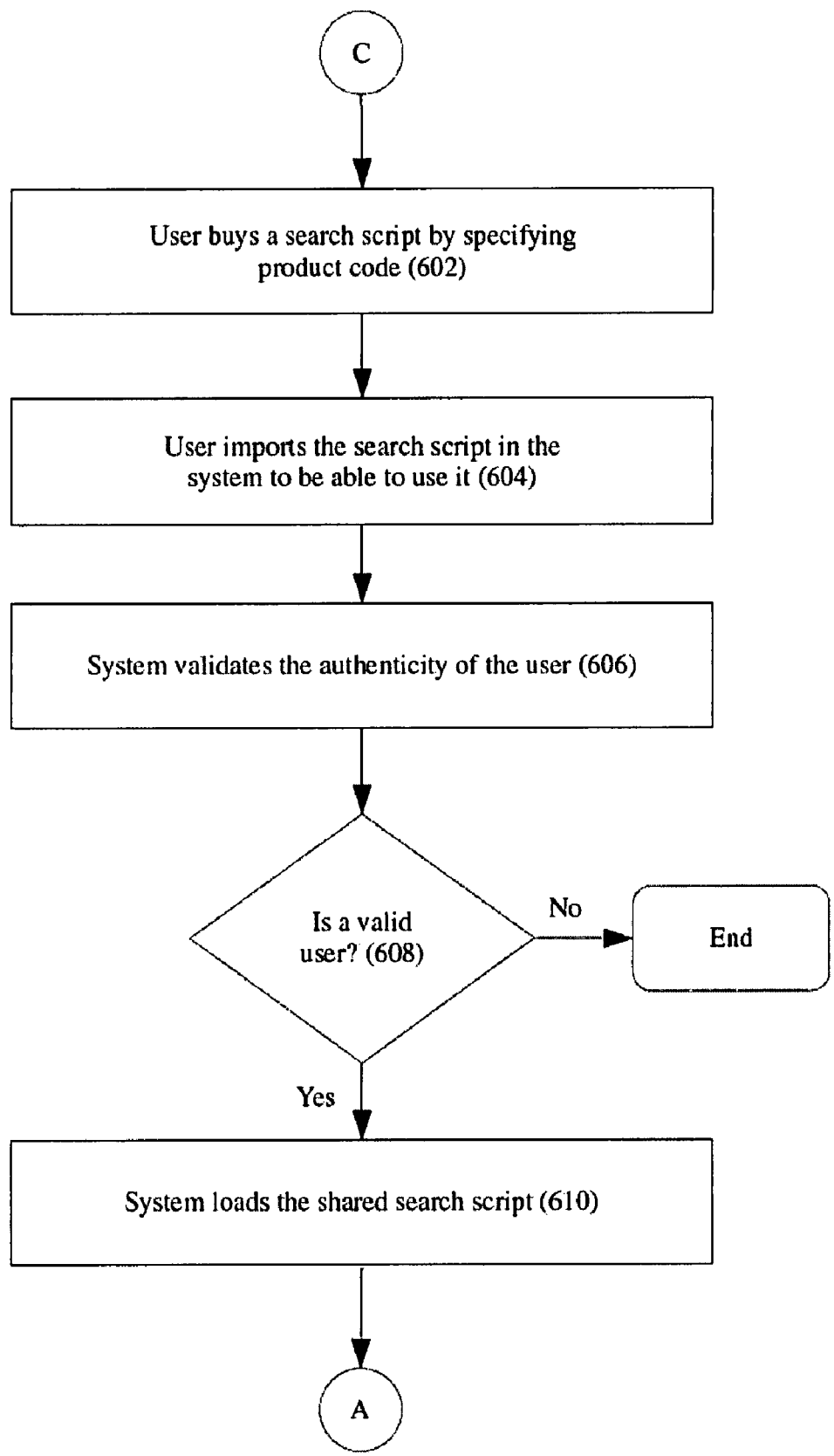
FIG. 6 is a flow chart showing the steps in receiving a shared search script.

Upon creating a search script, user can use a search script to perform domain specific searches. FIG. 4 is a flow diagram showing the steps involved in performing a domain specific search. User chooses one of the available search scripts to be used for search (402). User further configures the domain specific parameters using knowledge base according to his needs (404). In other words, user specifically the chooses the values to be used for subsequent searches from knowledge base for plurality of domain specific parameters. The specific information chosen from knowledge base to be used as values for placeholders is called domain configuration information. User provides the input search string with one or more keywords to be used for search. (Example search keyword:Java) (406). The loader of the query processing unit of the system loads the respective search script along with domain configuration information (408) and passes the information onto the interpreter. The interpreter of the query processing unit of the system parsers the search script, identifies the placeholders and substitutes the necessary values (410) as shown below:
Parameterized search query:
 @SEARCH_ENGINE=@KEYWORD ~resume inurl:resume -jobs @SITE @ZIP
Search keyword placeholder gets replaced with user input search string
<SEARCH_ENGINE: www.google.com>=Java ~resume inurl:resume -jobs @SITE @ZIP
Domain configuration parameter placeholders get replaced with values from appropriate configuration information.
<SEARCH_ENGINE: www.google.com>=Java OR J2EE OR JSP OR J2ME OR EJB ~resume inurl:resume -jobs @SITE(craigslist.org) @ZIP(CALIFORNIA)

The query formed is a search engine independent query. The search engine translator of the query processing unit of the system converts the final query into search engine (Google in this example) specific query (412).

Java OR J2EE OR JSP OR J2ME OR EJB ~resume inurl:resume -jobs site:craigslist.org 90000. . . 96199

A search script could contain more than one query and therefore, the queries could be intended for more than one search engine. Finally, the query processing unit invokes one or more instances of an application (Example, a web browser) to query one or more search engines (414) based on the queries interpreted from the search script.

Along with creating and managing search scripts, the present invention also provides facility to create profiles. A profile would include the configuration information as configured by a user. The system provides facilities for a user to share search scripts along with configuration information attached to a profile.

Experts who create search scripts specific for a purpose may choose to share one or more of their search scripts (502). The sharing could for free or for a license fee (504) (a license fee could mean a lumpsum, fixed, royalty payment or any combination of these type of payments). A shared search script (SSS) is typically a compressed binary file comprising of a search script, and profile information as applicable to the search script. However, in another embodiment, users can also share search scripts alone without profile information. A user who wishes to share his search script can simply share a search script by distributing the script via email. The system invokes an email program to distribute the search script. User can specify the other users to whom he wishes to distribute the script (512) and distribute the script by sending the email (514). Alternatively, if a user (Example, an expert user) wishes to license (or sell) his search script, he could upload a search script along with profile information on to a remote server (506). The import export manager of the present invention directly exports the SSS to search script repository of the remote server (508). The registration module of the remote server assigns a unique SSS id to the uploaded SSS (510). The uploaded SSS is further encoded with the unique SSS id (512). In another embodiment, the import export manager could export a search script alone without profile information.

The system provides facility for users to buy and download licensed SSS's from the remote server. A user can buy an SSS by specifying the registered product code on which the user is going to import the SSS (602). The remoter server creates a map of unique id assigned to SSS and the product id provided by the user. Upon downloading the licensed SSS, user imports SSS using the import export manager of the system of the invention (604). The import export manager checks the needs to validate by checking if the SSS is an encoded SSS and validates the authenticity of the user by verifying product code that was initially provided to the remote server with the product code of the system into which the SSS is being imported into, by using the unique id assigned to the SSS (606). If the user is found to be a valid user (608), the system loads the SSS (610), which the user may subsequently use until the license is valid. A free SSS may also be available on the remote server. Free SSS will not be associated with any unique identifier. Users do not have to provide a product code to download a free SSS. A free SSS will be imported by the import export manager without any further verification, as the free SSS is not assigned a unique identifier.

Figure 7:
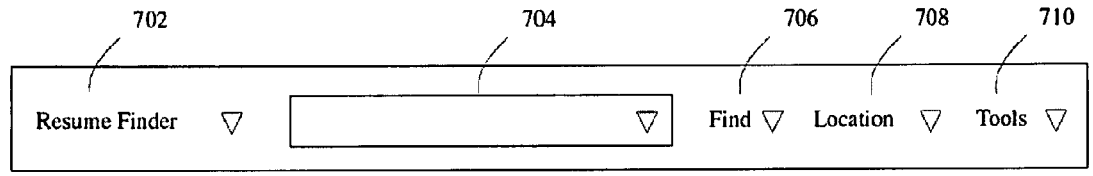
FIGS. 7, 7A, 7B, 7C, 7D shows the visual representation of the client program product as a tool bar in one embodiment of the invention.

FIG. 7 shows the visual representation of the computer program product of the invention as a tool bar that can be installed on a client computer. In one embodiment, the tool bar can be installed as a plug-in to a standard web browser like an Internet Explorer or Firefox. The tool bar provides a domain chooser (702), a search bar (704) to key in search keywords, a "Find" toolbar section to view/set script settings (706), a "Location" tool bar section to view/set location settings (708), and a tools section to launch and set various configuration options (710).

In another embodiment, an ordinarily skilled person in the art will appreciate that the computer program product could also be a stand alone application running on a computer including but not limited to personal computers, laptops, desktops and any other portable computing devices capable of running such a computer program product. In yet another embodiment, the computer program product could also be a web application delivered from a server accessed through an application like a web browser.

Figure 7A:
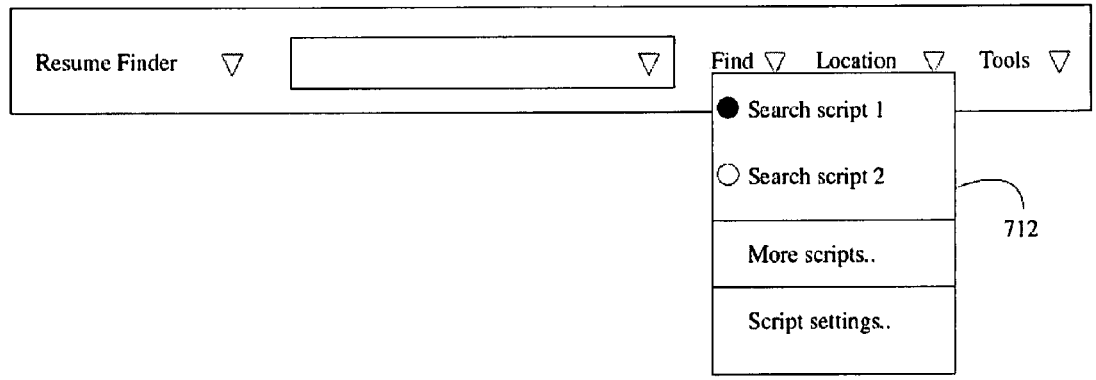

The "Find" section allows a quick view of current script settings (712). As shown in FIG. 7A, the tool bar shows the currently loaded scripts. User may choose to select one or more of loaded scripts. If a user selects only one script, queries from that script alone are executed. If a user selects more than one script, queries from all the chose the selected scripts. In FIG. 7A, only script is selected to be used for search, and only "Search script 1" will be used for the next search. Along with current script settings, the "find" tool bar sections allows to browse the available scripts to be downloaded by redirecting to a web page on a remote server, when the user clicks the "More scripts." button. Additionally, the user may launch script configuration options by clicking the "Script settings." button.

Figure 7B:
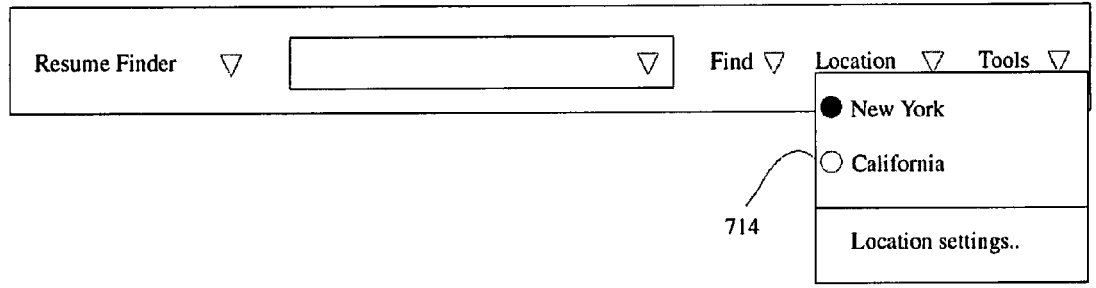

The "Location" section of the tool bar allows a quick view of current location settings (714). As shown in FIG. 7B, the tool bar shows the currently selected locations. Among those selected, the user can choose to use all or only a subset of locations. In the figure, location New York and California are selected. But only New York is chosen to be used for the next search. Additionally, the "location" section also allows launching location configuration options by clicking the "Location settings. . . " button.

Figure 7C:
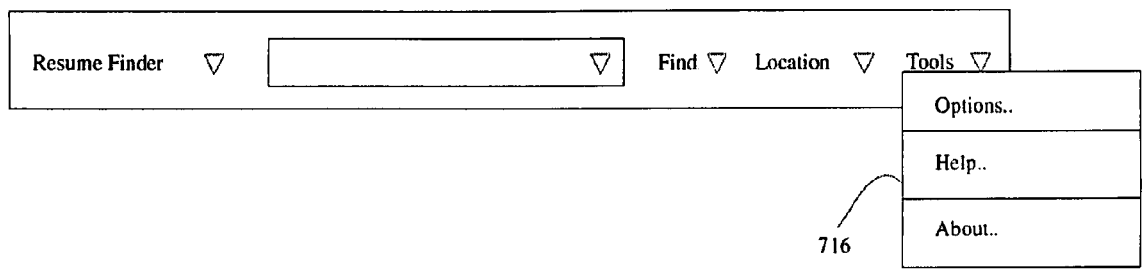

FIG. 7C shows the "Tools" section of the tool bar. The "Tools" section has options to launch configuration options by clicking the "Options" button (716). In addition, the "Tools" section also has the options of "Help" to provide help contents on how to use the tool bar, and "About. . . " to show the information about the tool bar.

Figure 7D:
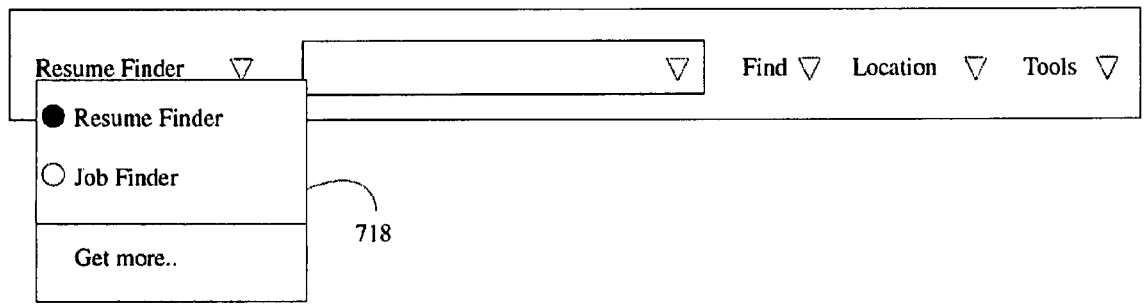

The tool bar allows for seamless switching between domains. For example, as shown in FIG. 7D, the tool bar may be shipped with more than one domain specific search capabilities. In FIG. 7D, "Job Finder" is another domain search capability that is shipped along with "Resume Finder". Clicking on "Job Finder" would reload the tool bar to change the tool bar according to the parameters required for "Job Finder". The "Resume Finder" is discussed in detail as an example, but not in a limiting sense. In one embodiment, an option is provided expand the capability of the tool bar to include more such domain specific search capabilities.

Figure 8:
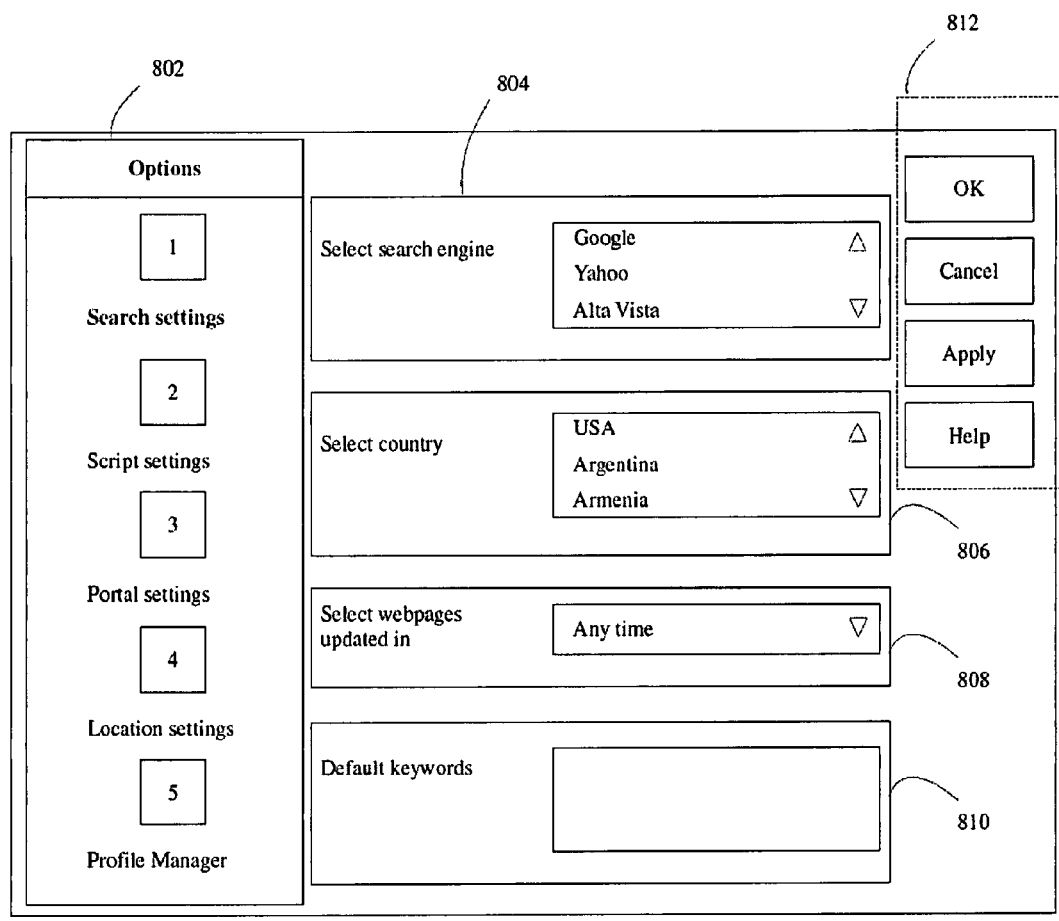

The "Options" button to launch configuration options as shown in FIG. 7C launches a configuration section with a plurality of options. FIG. 8 shows the general search related options (802). Under this section, a user can choose one or more search engines to be included in the current profile (804). User can also select the country to which the search engines are to be restricted to (806). The tool bar is pre-loaded with country specific URL for the search engines. Upon selecting a country, the tool bar automatically chooses the right URL from a map of countries and corresponding search engine URLs. User can also select the web pages by the recency of updates on the web pages (808). Additionally, user can also specify the default set of keywords that need to be attached for subsequent searches that the user will perform using the current profile till he changes configuration of the current profile (810).

The configuration options also come with a set of buttons (812). The "Ok" button will apply all changes that have been made and closes the options window. The "Cancel" the button revokes any changes that have been made that are not applied yet, and closes the options window. The "Apply" button applies any changes that are made without closing the options window. The "Help" button launches the relevant section of help contents to help user use the various search options available.

Figure 9:
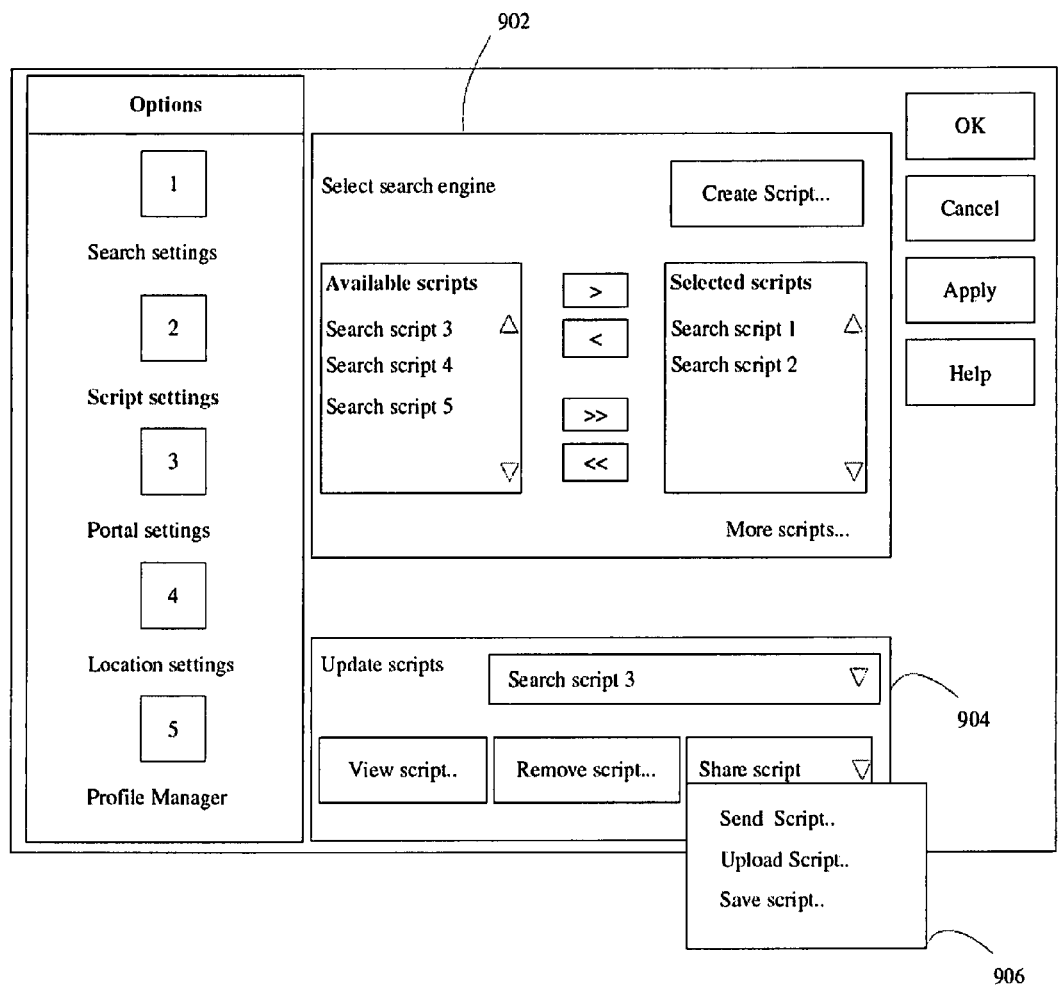

FIG. 9 shows the script related configuration options available to a user. A user can create a new script by clicking on the "Create Script . . . " button (902). The user will be asked for a name. Upon entering a name, the new script name will appear in the "Available scripts" list. The user can choose one or more of the available scripts to be selected to be included in the current profile. Also in the update scripts section (904), user can view and edit a script by using the "View script." button. User can also remove a script. Removing a script will automatically remove the script from the available or selected scripts list. Additionally, user can also choose to share a script by using the "Share script" button. Sharing can be performed through multiple options (906). The "Send script." option enables a user to send a script as an email by launching the preferred email program. The "Upload script." option activates the import export manager of the invention to directly export the script to a remote server along with the configuration information of the current profile and directs the user to a web page to fill out various options. Additionally, user can also save a script to share by any other means.

In another embodiment, it may also be possible for the user to upload the script alone without the configuration information of the profile.

FIG. 10 shows the web page to which a user is directed to when he chooses to upload a script directly from the tool bar. The user can provide a name for the script as a display name and provide a brief description of the nature of the script (1002). The user can also indicate the price at which the script is to be made available to users who may be interested in downloading the script (1004). The user may also choose to make the script available for free, in which case he will not have to fill the price (1004). Upon filling the details, the user can submit the options by using the "Submit" button. Alternatively, he can also "Cancel" any details entered and enter new details before submission.

Figure 11:
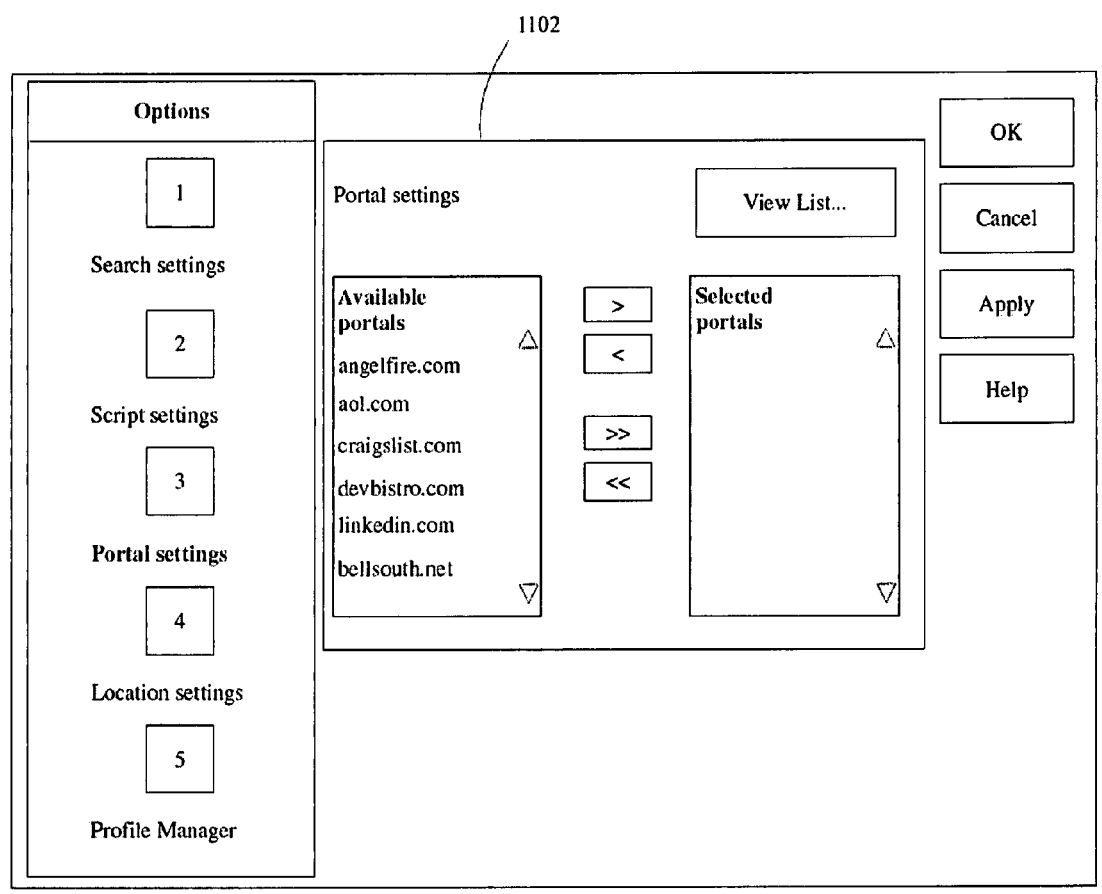

FIG. 11 shows the portal (words "portal" and "site" are used interchangeably in the script) related configuration options. User is presented with a list of available portals in the knowledge base from which the user can select one or more portals to be included in the current profile. User can also customize the portal settings by launching the portal table using the "View List. . ." button. The user is presented with a portal settings table as shown in FIG. 12. The user can add more portals or remove listed portals by using the buttons provided in the button panel (1204) and therefore making the knowledge base customizable. In addition, user can also specify the caption name, which is the name to be displayed, the name of the site, specific keywords associated with a portal that should be used whenever needed, and the actual URL of the portal (1202). An expert user might know portals that provided more quality resumes and he would be able to add such portals to his portal settings. Also the portal specific keywords help in refining search within a portal by adding positive keywords (profiling in) that commonly occur in resume pages and by adding negative keywords (profiling out) to identify non-resume pages that have certain known keywords. In another embodiment, specific placeholders could be used to include or exclude keywords for the purposes of profiling in and profiling out.

Figure 13:
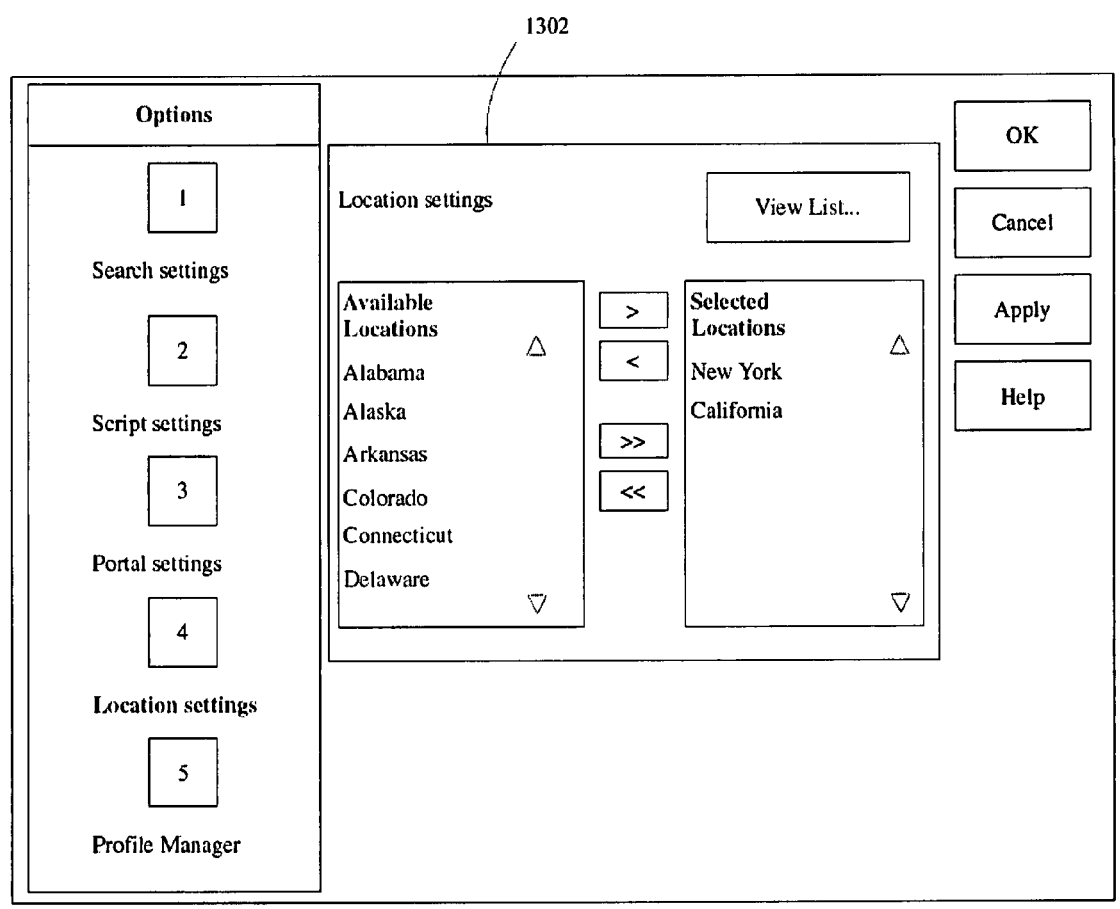

FIG. 13 shows the location related configuration options. User is presented with a list of available locations in the knowledge base. User can select one or more locations to be included in the current profile. Additionally, user can also customize the location list by clicking on the "View List. . ." button. The user is presented with a table of locations as shown in FIG. 14. Apart from the location name, the table contains the zip range for the location, the time zone to which the location belongs, and the telephone codes that belong to a particular location (1402). The user can add or remove location entries using the button panel (1404) and therefore making the knowledge base customizable. A user can also update the zip range, time zone and telephone codes if there is any change.

Figure 15:
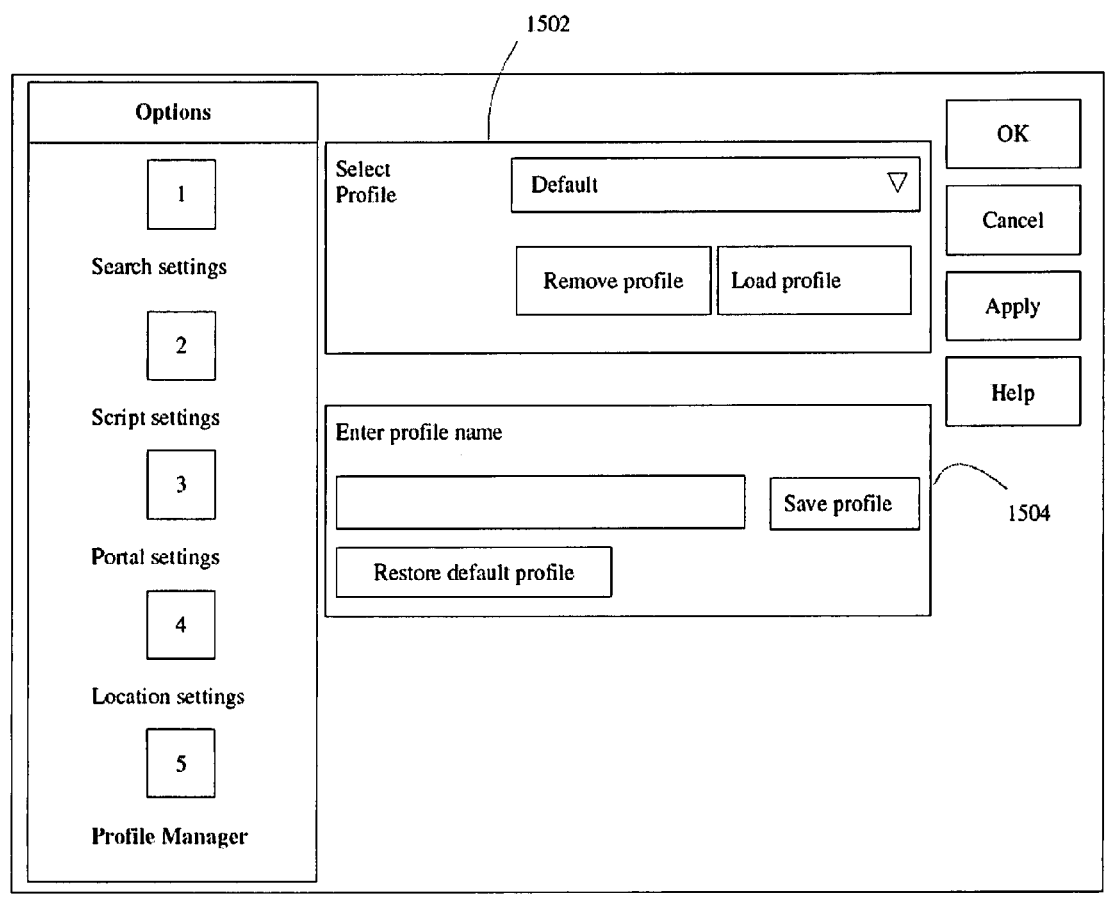

All the configuration options chosen can be saved under a profile as shown in FIG. 15 under profile settings. User can have as many profiles as he desires. When a user enters a profile name and saves a profile using the "Save profile" button, the current configuration options chosen will be chosen a pre-determined format (1504). User can load any saved profile at any point of time. For example, a recruiter might be working for two different companies in different states. Therefore, user might want to have different location settings for different companies that he is working for. In such a scenario, profiles help him save the configuration and reload whenever he wants to (1502) without having to change search scripts. As shown in FIG. 15, a profile can also be removed (1502) using the "Remove profile" button.

FIG. 16 shows a web page listing available search scripts to be downloaded. A user who wishes to buy a search script can do so by providing the product code of the tool bar that he has installed on his computer. The remoter server hosting the search scripts maintains a map of shared search script (SSS) unique id and product code provided by buyers of the shared search scripts. When a user tries to import a shared search script, the import export manager identifies the unique id with which the shared search script (SSS) is encoded, and requests the remote server to match by providing both the product code of the tool bar and the unique id associated shared search script. Remote server verifies the combination by comparing with the map the server maintains and returns a result. When a search script is made available for free, user need not provide the product code as no verification will be necessary.

In a preferred embodiment, the tool bar is pre-loaded with extension configuration for certain keywords. For example, if a user would like to search for resumes relating to Java technology, it is possible that he would like to obtain resumes relating to all technologies that fall with in the Java technology domain namely: J2EE, JSP, J2ME, EJB etc. The user may provide a keyword in the format "@EQ(Java)", where "Java" is the keyword to which equivalents are to be included. The present invention provides for an extension configuration where certain keywords can be extended to mean a set of keywords and such keywords used in the parameterized search query or in the input search query will be replaced with extension entries.

EXAMPLE

@EQ(Java)=Java OR J2EE OR JSP OR J2ME OR EJB

In a preferred embodiment, the knowledge base also includes the information relating to distance between any two zip code locations that are included in the knowledge base. This would enable the determination of location range to be included in a search query given a "@RADIUS_ZIP" placeholder in a search script. The query processing unit of the computer program product computes the various zip locations falling within the radius distance provided from the provided zip location using the distance information in the knowledge base.

The embodiment described in detail is related to finding resumes. However, in other embodiments, the present invention can be used for other domains. Some example domains include finding job postings, finding whitepapers, finding experts etc.

In another embodiment, the present invention can be used to enable users to create and share domain specific search scripts to enable domain specific searches in the domain of finding job postings to help candidates in searching for job postings.

The present invention standardizes user input into industry specific nomenclature by applying its domain specific knowledge base and fetches results matching the job profile of a user.

Taking the example of a person looking for a job in the fielf of accounting, the person would typically know a few details and have preferences. In this example the person has obtained a CCA degree and he is looking for a job in the field of accounting. He may know the location where he would prefer to work. He may also at times know the tasks they would most love to do or not do.

A casual job seeker may type into a search engine like Google the following and get restricted results.

Casual user example: "Jobs in accounting CCA"

An expert user may type into Google the following, for the same requirement, and get better results.

Expert user example: intitle:"job opening" (Accounting|Audit|Tax|Bookkeeping) (CCA|CPA) -~"resume of"

The present invention allows for creation and sharing of search scripts and enable users to perform domain specific searches where domain specific knowledge is already provided to the users as illustrated in the previous embodiment of finding resumes.

The present invention provides for creation of parameterized queries. For example, the aforementioned query can be defined as follows:

@KEYWORD intitle:"job opening" @JOB_CATEGORY @JOB_DEGREE -~"resume or"

where "JOB_CATEGORY" and "JOB_DEGREE" are domain specific parameters that are needed to refine results according to the profile of users in the domain of finding job postings. The present invention provides for a knowledge base which users can use to configure the parameters according to their needs. The knowledge base could vary based on the job category, job title, location of the job and various other parameters.

In the aforementioned example of a person looking for a job in the accounting field, JOB_CATEGORY may be assigned a value of "Accounting" and knowledge base could be used to extend the same to mean "Accounting" OR "Audit" OR "Tax" OR "Bookkeeping". And the placeholder "JOB_DEGREE" may be assigned a value "CCA" according to the choices made by the user using the various configuration tables as illustrated in the embodiment of finding resumes. Again, the knowledge base could be used to extend the degree to mean "CCA" OR "CPA" (as in certain cases both degrees may be eligible for an account job). Using the knowledge base in accordance with users' configuration choices, ultimate queries are built.

Table 2 shows a few example placeholders for configurable parameters based on which knowledge base could be built to enable users to search for job postings. The table is does not show an exhaustive list of parameters that are actually useful for finding job postings. The parameters of LOCATION, CITY, ZIP etc that were used to illustrate the embodiment of finding resumes are very much useful here and any skilled person in the art would be appreciate that these and many such parameters could be added and knowledge base could be built to enable domain specific searches in the field of finding job postings.

TABLE 2

| Placeholder | Description |
| --- | --- |
| JOB_CATEGORY | Specifies a category of job to be searched<br>Ex: JOB_CATEGORY (Accounting) = Accounting, Audit, Tax, Forensic |
| JOB_DEGREE | Specifies the degrees to be searched for<br>Ex: JOB_DEGREE(MBA-Accounting) = MBA in Accounting, CCA, CA, CPA |
| JOB_TITLE | Specifies the title to be searched for<br>Ex: JOB_TITLE(Tax Manager) = Tax Manager, Audit Manager, Tax accountant, Fund Manager |
| PORTAL | Specifies the website or portals from which the search results are to be obtained for a particular Job category<br>Ex: JOB_PORTAL = www.insurancejobsboard.com |
| JOB_COMPANY | Major employers for that Job Category |
| JOB_TYPE | Specified the employment type to filter the search results for<br>JOB_TYPE = Full Time, Part Time, contractor, intern etc., |
| JOB_PROFILEIN | Specifies default set of keywords that are generally found in relevant job postings pages. User can choose to include one or more of these in his searches. |
| JOB_PROFILEOUT | Specifies default set of keywords that are generally found in irrelevant pages and user can choose to exclude one or more of these in his searches. |

Table 3 shows example knowledge base for the various parameters shown in Table 2. As shown in Table 3, the knowledge base is not restricted to one specific field and could include more than one field (ex: accounting, nursing, information technology). As illustrated in the previous embodiment of finding resumes, users can configure and add more information to the configuration tables to expand the knowledge base.

TABLE 3

| Parameter | Accounting | Nursing | Information Technology |
| --- | --- | --- | --- |
| JOB_CATEGORY | Accounting<br>Audit<br>Tax<br>Forensic<br>Bookkeeping | | IT<br>IT Software |

TABLE 3-continued

| Parameter | Accounting | Nursing | Information Technology |
|---|---|---|---|
| JOB_PORTAL | ihireaccounting.com<br>jobsinthemoney.com<br>insurancejobsboard.com | idohealthcare.com<br>accessnurses.com<br>nurseportal.com<br>nursingjobsource.com<br>jobforuscitizens.com | Siteexperts.com<br>devbistro.com<br>craigslist.com<br>linkedin.com<br>aol.com |
| JOB_TITLE | Tax Manager =><br>Audit Manager<br>Tax accountant<br>Fund Manager | Nurse<br>Practitioner =><br>NP<br>Clinical Nurse | Network Technician =><br>Network Support Analyst<br>Network Engineer<br>Network Administrator |
| JOB_DEGREE | MBA Accounting =><br>MBA in Accounting<br>CCA<br>CA<br>CPA | Master of Science Nursing =><br>Health Care Management,<br>M.S. in Nursing | BSIT =><br>B.S. Information Technology<br>BIT<br>B.Tech IT |
| JOB_COMPANY | www.deloitte.com<br>www.ey.com<br>www.kpmg.com | www.hopkinsmedicine.org,<br>www.brighamandwomens.org,<br>www.ucsfhealth.org | www.cisco.com<br>www.adventnet.com<br>www.unitedsystems.com |
| JOB_PROFILEIN | job listing,, job opening, job title, job description, job code, apply to, send resume, submit resume | | |
| JOB_PROFILEOUT | sample, resume of, hobbies, personal profile, objective | | |

Example queries for finding job postings are provided below:

Example 1

Candidate looking for a job as an Accountant

Parameterized search query:
intitle:"job opening" @JOB_CATEGORY @JOB_DEGREE -~"resume of"
Google search engine specific query:
intitle:"job opening" (Accounting|Audit|Tax|Bookkeeping)(CCA|CPA) -~"resume of"

Example 2

Candidate looking for a job as a Nurse

Search script query:
(intitle:"job listings"|intitle:"—job") @JOB_CATEGORY job -~resume @JOB_PORTAL
Google search engine specific query:
(intitle:"job listings"|intitle:"~job") nurse job -~resume site:idohealthcare.com Example 3

Candidate looking for a job as Network Engineer

Search script query:
"job posting" @JOB_CATEGORY @JOB_TITLE(Network Engineer) @KEYWORD (intext:full time|intext:part time)-(intext:objective)
Google search engine specific query:
("job posting"|"job opening") IT ("Network Engineer"|"Network Administrator") LAN/WAN (intext:full time|intext:part time) -~objective For the domain of finding jobs, the tool bar may contain different set of configuration tables as part of the knowledge base to enable configuration for parameters chosen. The relevant knowledge base will be automatically loaded in its current state based on the domain chosen on the tool bar.

Although the present invention has been described with particular reference to specific embodiments and examples, variations and modifications to the present invention can be effected within the spirit and scope of the following claims.

What is claimed is:

1. A computer implemented method to enable a non-expert user to perform domain specific searches relating to a particular domain, the method comprising the steps of:
an expert user creating a domain specific search script relating to said particular domain, wherein creation of said domain specific search script further comprises:
defining domain specific keywords relating to said particular domain, placeholder for input search string and placeholders for a plurality of pre-defined domain specific parameters relating to said particular domain;
configuring said plurality of pre-defined domain configuration parameters relating to said particular domain using a knowledge base;
creating a search script in a pre-determined format with placeholders for input search string and a plurality of domain specific parameters from said plurality of pre-defined domain configuration parameters relating to said particular domain;
sharing said domain specific search script along with configuration information with a non-expert user;
said non-expert user using said shared domain specific search script along with configuration information to perform domain specific searches relating to said particular domain, wherein using said domain specific search script further comprises:
selecting said shared search script to perform a domain specific search relating to said particular domain;
specifying input search string with one or more keywords relating to said particular domain for search;
replacing at least one of said placeholders in said search script by said input search string as provided by the user;
replacing one or more keywords in said search script with domain configuration information from said knowledge base, wherein said domain configuration information comprises of domain specific sites, site specific keywords, default keywords, location, phone, zip, radius, time zone, search engine, search URL and extension keywords, and wherein keywords replaced with domain configuration information comprise of said domain specific keywords defined by said expert user, and keywords provided by said non-expert user as part of said input search string; and performing search in one or more search engines according to the instructions in said search script and producing results obtained from said one or more search engines.

2. The method as in claim 1, the method further comprising the step of user saving configuration information as a profile.

3. The method as in claim 1, where said particular domain is finding resumes.

4. The method as in claim 1, where keywords specified comprise of positive keywords and negative keywords.

5. The method as in claim 1, where said particular domain is finding job postings.

6. The method as in claim 1, where said particular domain is finding experts.

7. The method as in claim 1, where said particular domain is finding white papers.

8. A computer implemented system to enable a non-expert user to perform domain specific searches, the system comprising of:

a remote server;
a client computer;
a shared search script repository storing all available shared search scripts with or without configuration information;
a registration module to register shared search scripts, and
a user interface module to allow users to view, buy and download available shared search scripts from said shared search script repository;
a search script unit to create, manage, import and export search scripts, said search script unit further comprising:
  a script generator to create search scripts;
  an import export manager to import and export search scripts with or without configuration information;
  a domain configuration module to enable configuration of domain specific parameters to be used in search scripts;
  a script manager to manage scripts generated by script generator and imported through the import export manager;
  a knowledge base comprising a plurality of domain configuration tables; and
a query processing unit to load, interpret, and translate search scripts and further to query search engines, said query processing unit further comprising:
  a loader to load search scripts;
  an interpreter to interpret search script and replace placeholders in loaded search scripts with values from a plurality of configuration tables to form a search engine independent query and with keywords from user input string;
  a search engine translator to translate search engine independent query into one or more search engine specific queries to be used to query one or more search engines; and
  a communication link between said remote server and said client computer.

9. The computer system as in claim 8, where the computer program product is a browser plug-in.

10. The computer system as in claim 8, where domain is finding resumes.

11. The computer system as in claim 10, where said knowledge base includes information relating to but is not limited to domain specific sites, site specific keywords, default keywords, location, phone, zip, radius, time zone, search engine, search URL and extension keywords.

12. The computer system as in claim 8, where domain is finding job postings.

13. The computer system as in claim 8, where domain is finding experts.

14. The computer system as in claim 8, where domain is finding white papers.

15. The computer system as in claim 8, where the communication link is Internet.

16. A computer program product embodied in a computer readable medium to enable a non-expert user to perform domain specific searches relating to a particular domain, the computer program product comprising:

an expert user creating a domain specific search script relating to said particular domain, wherein creation of said domain specific search script further comprises:
  defining domain specific keywords relating to said particular domain, placeholder for input search string and placeholders for a plurality of pre-defined domain specific parameters relating to said particular domain;
  configuring said plurality of pre-defined domain configuration parameters relating to said particular domain using a knowledge base;
  system creating a search script in a pre-determined format with placeholders for input search string and a plurality of domain specific parameters from said plurality of pre-defined domain configuration parameters relating to said particular domain;
sharing said domain specific search script along with configuration information with a non-expert user;
said non-expert user using said shared domain specific search script along with configuration information to perform domain specific searches relating to said particular domain, wherein using said domain specific search script further comprises:
  selecting said shared search script to perform a domain specific search relating to said particular domain;
  specifying input search string with one or more keywords relating to said particular domain for search;
  system replacing at least one of said placeholders in said search script by said input search string as provided by the user;
  system replacing one or more keywords in said search script with domain configuration information from said knowledge base, wherein said domain configuration information comprises of domain specific sites, site specific keywords, default keywords, location, phone, zip, radius, time zone, search engine, search URL and extension keywords, and wherein keywords replaced with domain configuration information comprise of said domain specific keywords defined by said expert user, and keywords provided by said non-expert user as part of said input search string; and
  system performing search in one or more search engines according to the instructions in said search script and producing results obtained from said one or more search engines.

17. The computer program product as in claim 16, where the computer program product is a browser plug-in.

18. The computer program product as in claim 16, where the computer program product is a web application.

19. The computer program product as in claim 16, where the computer program product is a stand-alone application.

20. The computer program product as in claim 16, where the computer program product is adapted to enable domain specific search for one or more domains, and where the computer program product maintains a map of domains, corresponding knowledge base, and corresponding profiles information.

21. The computer program product as in claim 16, where said particular domain is finding resumes.

22. The computer program product as in claim 21, where said knowledge base includes information relating to but is not limited to domain specific sites, site specific keywords, default keywords, location, phone, zip, radius, time zone, search engine, search URL and extension keywords.

23. The computer program product as in claim 16, where said particular domain is finding job postings.

24. The computer program product as in claim 16, where said particular domain is finding experts.

25. The computer program product as in claim 16, where said particular domain is finding white papers.

* * * * *